(12) United States Patent
Liu et al.

(10) Patent No.: US 12,487,175 B2
(45) Date of Patent: Dec. 2, 2025

(54) THREE-DIMENSIONAL IMAGING WITH ENHANCED RESOLUTION

(71) Applicant: KLA Corporation, Milpitas, CA (US)

(72) Inventors: Xiumei Liu, Fremont, CA (US); Mark S. Wang, San Ramon, CA (US)

(73) Assignee: KLA Corporation, Milpitas, CA (US)

( * ) Notice: Subject to any disclaimer, the term of this patent is extended or adjusted under 35 U.S.C. 154(b) by 840 days.

(21) Appl. No.: 17/568,995

(22) Filed: Jan. 5, 2022

(65) Prior Publication Data

US 2022/0252512 A1 Aug. 11, 2022

Related U.S. Application Data

(60) Provisional application No. 63/146,749, filed on Feb. 8, 2021.

(51) Int. Cl.
| | |
|---|---|
| *G01N 21/47* | (2006.01) |
| *G01B 11/27* | (2006.01) |
| *G01B 21/04* | (2006.01) |
| *G01N 21/17* | (2006.01) |

(52) U.S. Cl.
CPC ....... *G01N 21/4788* (2013.01); *G01B 11/272* (2013.01); *G01B 21/045* (2013.01); *G01N 21/1717* (2013.01); *G01N 2021/1785* (2013.01)

(58) Field of Classification Search
CPC ............. G01N 21/4788; G01N 21/717; G01N 21/045; G01N 2021/1785; G01N 2021/1782; G01B 11/272; G01B 11/24; G01B 11/022; G01B 21/045
USPC .................................................. 356/601–625
See application file for complete search history.

(56) References Cited

U.S. PATENT DOCUMENTS

| | | | |
|---|---|---|---|
| 11,118,903 B2 | 9/2021 | Hill et al. | |
| 11,592,653 B2 * | 2/2023 | Liu | ...................... G02B 21/244 |
| 2006/0098213 A1 * | 5/2006 | Itoh | .......................... G01B 9/04 |
| | | | 356/632 |

(Continued)

FOREIGN PATENT DOCUMENTS

| | | |
|---|---|---|
| TW | 201447285 A | 12/2014 |
| TW | 201918806 A | 5/2019 |
| WO | 2017162596 A1 | 9/2017 |

OTHER PUBLICATIONS

International Search Report in Application No. PCT/US2022/014176 dated May 16, 2022, 10 pages.

(Continued)

*Primary Examiner* — Hina F Ayub
(74) *Attorney, Agent, or Firm* — Suiter Swantz IP

(57) ABSTRACT

An imaging system may include an imaging metrology tool with an illumination source, one or more illumination optics to direct illumination from the illumination source to a sample, a detector, one or more collection optics to image the sample onto the detector; and one or more aberration-controlling components. The one or more aberration-controlling components may provide aberration correction for imaging the sample onto the detector according to one or more degrees of freedom, where the one or more degrees of freedom include at least a defocus of the imaging system, and where the one or more aberration-controlling components are integrated with at least one of the one or more illumination optics, the one or more collection optics, or the detector.

50 Claims, 13 Drawing Sheets

(56) References Cited

U.S. PATENT DOCUMENTS

| | | | |
|---|---|---|---|
| 2010/0165290 A1* | 7/2010 | Shea | A61B 3/0025 |
| | | | 715/764 |
| 2012/0044455 A1 | 2/2012 | Hirose | |
| 2018/0035883 A1 | 2/2018 | Kumar et al. | |
| 2018/0242838 A1 | 8/2018 | Sarunic et al. | |
| 2019/0026885 A1 | 1/2019 | Gready et al. | |
| 2019/0378012 A1 | 12/2019 | Tripodi et al. | |
| 2020/0150423 A1 | 5/2020 | Matsumoto | |
| 2020/0348603 A1* | 11/2020 | Staals | G03F 7/70625 |
| 2022/0082944 A1* | 3/2022 | Rehman | G03F 7/70616 |

OTHER PUBLICATIONS

Taiwan Patent Office, Office Action received in TW Application No. 111102114, Jan. 24, 2025, 26 pages (including translation).

* cited by examiner

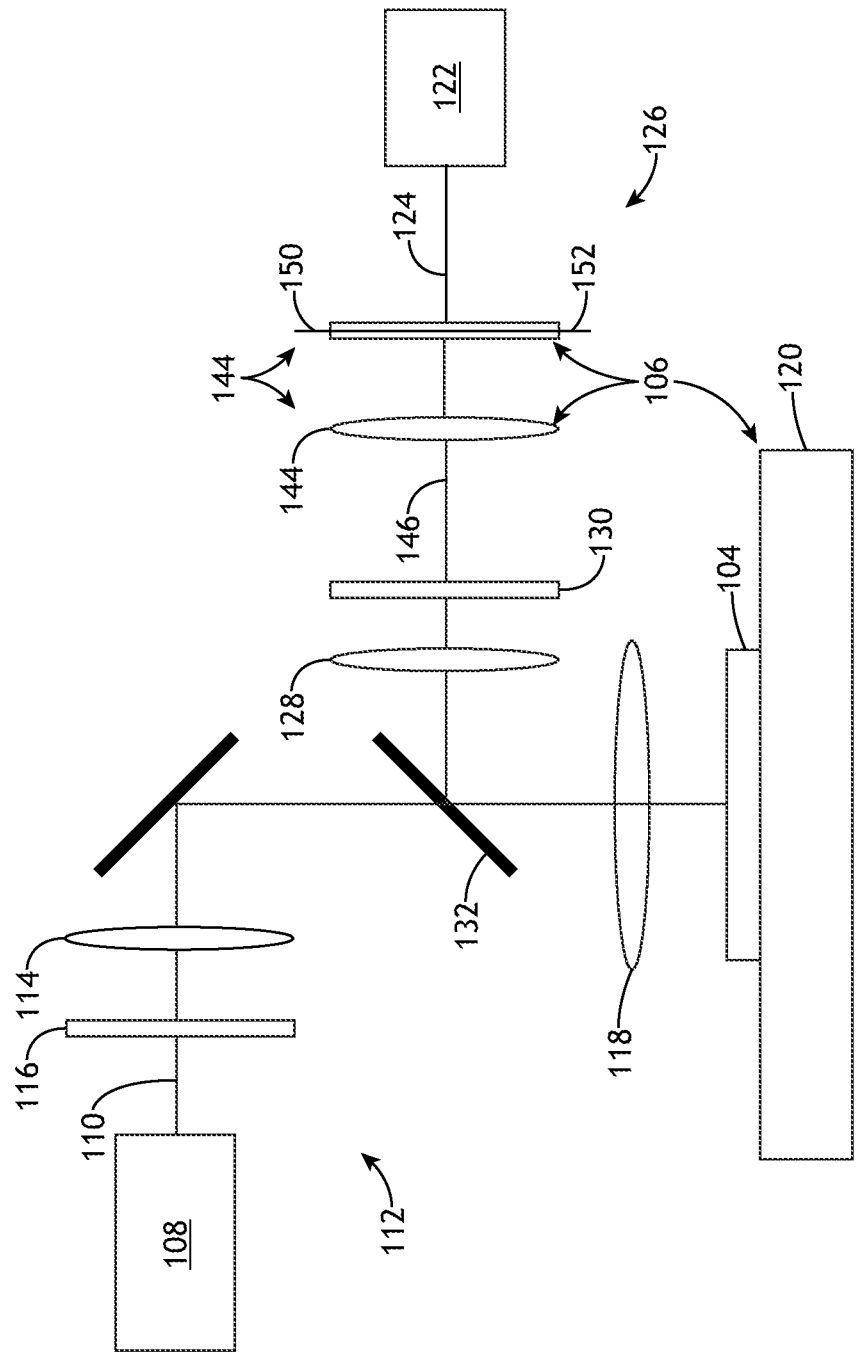

THREE-DIMENSIONAL IMAGING WITH ENHANCED RESOLUTION

CROSS-REFERENCE TO RELATED APPLICATION

The present application claims the benefit under 35 U.S.C. § 119(e) of U.S. Provisional Application Ser. No. 63/146,749, filed Feb. 8, 2021, entitled APPARATUS FOR 3D IMAGING WITH ENHANCED RESOLUTION, naming Xiumei Liu and Mark S. Wang as inventors, which is incorporated herein by reference in the entirety.

TECHNICAL FIELD

The present disclosure relates generally to sub-surface imaging and, more particularly, to dynamically tuning imaging conditions to provide aberration-corrected sub-surface imaging at various depths.

BACKGROUND

It is increasingly desirable to flexibly provide high-resolution imaging at various depths within a material. As an illustration, trends in the semiconductor industry are leading to increasingly three-dimensional device designs (e.g., three-dimensional memory devices, or the like), which requires quality-control measurements such as defect inspection within increasingly large depth ranges. As another illustration, advances in industries such as, but not limited to, machine vision and biological imaging are driving similar imaging challenges. However, current techniques for sub-surface imaging have limited range due to aberrations at sub-surface depths or are limited to fixed measurement depths. It is therefore desirable to provide systems and methods that cure the above deficiencies.

SUMMARY

An imaging system is disclosed in accordance with one or more illustrative embodiments of the present disclosure. In one illustrative embodiment, the system includes an imaging metrology tool including an illumination source, one or more illumination optics to direct illumination from the illumination source to a sample, a detector, one or more collection optics to image the sample onto the detector, and one or more aberration-controlling components providing aberration correction for imaging the sample onto the detector according to one or more degrees of freedom. In another illustrative embodiment, the one or more degrees of freedom include at least a defocus of the imaging system. In another illustrative embodiment, the one or more aberration-controlling components are integrated with at least one of the one or more illumination optics, the one or more collection optics, or the detector. In another illustrative embodiment, the system includes a controller to determine configurations of the one or more aberration-controlling components associated with the one or more degrees of freedom providing imaging of the sample onto the detector with a quality metric above a selected threshold for a range of imaging depths and to direct the imaging metrology tool to image at least a portion of the sample at two or more imaging depths in the range of imaging depths using the determined configurations of the imaging metrology tool.

An imaging system is disclosed, in accordance with one or more illustrative embodiments of the present disclosure. In one illustrative embodiment, the system includes an imaging metrology tool, where aberration correction of the imaging metrology tool is adjustable within three or more degrees of freedom. In another illustrative embodiment, the imaging metrology tool includes a translation stage for securing a sample, an illumination source, one or more illumination optics to direct illumination from the illumination source to the sample, a detector, one or more collection optics to image the sample onto the detector, and one or more aberration-controlling components providing aberration correction for imaging the sample onto the detector according to the three or more degrees of freedom. In another illustrative embodiment, the one or more aberration-controlling components are integrated with at least one of the one or more illumination optics, the one or more collection optics, the detector, or the translation stage. In another illustrative embodiment, the system includes a controller to determine configurations of the one or more aberration-controlling components associated with the three or more degrees of freedom providing imaging of the sample onto the detector with a quality metric above a selected threshold for a range of imaging depths and to direct the imaging metrology tool to image at least a portion of the sample at two or more imaging depths in the range of imaging depths using the determined configurations of the imaging metrology tool.

An imaging method is disclosed in accordance with one or more illustrative embodiments of the present disclosure. In one illustrative embodiment, the method includes determining configurations of one or more aberration-controlling components associated with the three or more degrees of freedom providing imaging of a sample with a quality metric above a selected threshold for a plurality of imaging depths with an imaging metrology tool. In another illustrative embodiment, the imaging metrology tool includes an illumination source to generate an illumination beam, one or more illumination optics to direct the illumination beam to the sample, a translation stage, an imaging detector, and one or more collection optics to collect light from the sample as collected light and direct at least a portion of the collected light to the imaging detector. In another illustrative embodiment, the three or more degrees of freedom include a sample defocus position corresponding to a position of the translation stage along an optical axis of the one or more illumination optics and configurations of one or more adjustable optical elements associated with the one or more collection optics. In another illustrative embodiment, the method includes imaging at least a portion of the sample at two or more imaging depths using the determined configurations of the imaging metrology tool.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

FIG. 1F is a conceptual view of an imaging metrology tool with aberration-controlling components including a phase plate at a pupil plane, in accordance with one or more embodiments of the present disclosure.

DETAILED DESCRIPTION

Figure 1A:
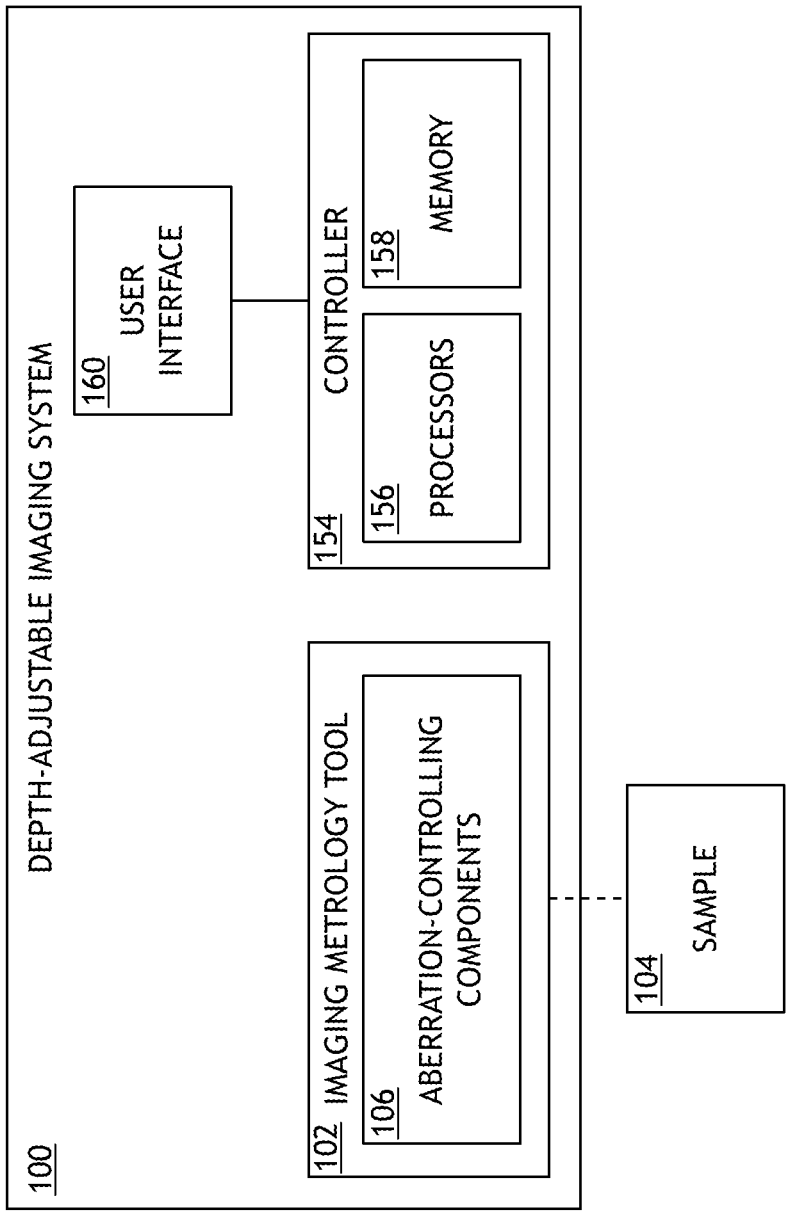
FIG. 1A is a block diagram view of a depth-adjustable imaging system, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for sub-surface imaging at a range of sample depths while maintaining imaging quality across all depths within the range.

It is contemplated herein that optical aberrations in an imaging system are highly sensitive to changes of the optical path of light within the system. As a result, modifying a sample position to provide an imaging focal plane below a surface of the sample for sub-surface imaging typically introduces optical aberrations and reduces the imaging quality. For example, an imaging system with aberration corrections tailored for surface imaging may exhibit increased aberrations and correspondingly reduced performance as imaging depth is increased. By way of another example, an imaging system with aberration corrections tailored for a particular sample depth may have a limited range of imaging depths providing acceptable imaging performance.

Embodiments of the present disclosure are directed to imaging with an imaging system having one or more degrees of freedom (DOF) for aberration control to provide dynamic aberration correction for imaging at various depths within a sample without degrading imaging resolution. In some embodiments, the degrees of freedom provided by an imaging system may include a position of the sample relative to an objective lens and at least one adjustable optical element within an imaging pathway. For example, the imaging system may include, but is not limited to, one or more movable lens elements in the imaging pathway or one or more adjustable phase plates to provide tailored aberration correction for various imaging depths. In some embodiments, an imaging system includes three or more degrees of freedom for aberration control. It is contemplated that the use of three or more degrees of freedom for aberration control may facilitate aberration-corrected imaging at a large range of depths while further providing additional benefits such as, but not limited to, limiting a range of sample motion required for imaging in the range or imaging at a constant magnification regardless of the imaging depth. However, it is further contemplated herein that the aberration control using one or two degrees of freedom may be sufficient for some applications.

Additional embodiments of the present disclosure are directed to calibrating an imaging system for imaging at various depths. In this way, the imaging system may be efficiently adjusted during run-time to provide aberration-corrected imaging at any depth. For example, configurations of the imaging system according to the one or more degrees of freedom providing aberration-corrected imaging for selected imaging depths in known sample types may be determined prior to run-time. After this calibration, the imaging system may be quickly adjusted for any of the selected imaging depths during run-time. Further, in some cases, configurations of the imaging system for additional imaging depths may be determined by interpolation or extrapolation of the configurations determined for the calibrated imaging depths. In this way, the imaging system is not limited to the precise imaging depths used for calibration.

Referring now to FIGS. 1A-6, systems and methods for aberration-corrected imaging at multiple imaging depths are described in greater detail, in accordance with one or more embodiments of the present disclosure.

FIG. 1A is a block diagram view of a depth-adjustable imaging system 100, in accordance with one or more embodiments of the present disclosure.

In some embodiments, a depth-adjustable imaging system 100 includes an imaging metrology tool 102 to image a sample 104 at a range of sub-surface depths, where the imaging metrology tool 102 includes aberration-controlling components 106 providing one or more degrees of freedom for adjusting aberration correction for the range of sub-surface depths. In this way, the imaging metrology tool 102 of the depth-adjustable imaging system 100 may provide adjustable aberration correction for imaging at a variety of depths below a surface of the sample 104.

The imaging metrology tool 102 may include any type of metrology tool known in the art suitable for generating aberration-corrected images of the sample 104, or a portion thereof, at multiple imaging depths. For example, the imaging metrology tool 102 may operate in any imaging mode known in the art including, but not limited to, a bright-field imaging mode or a dark-field imaging mode. Further, the imaging metrology tool 102 may be configurable to generate images of the sample 104 based on any number of recipes defining imaging parameters associated with configurations of the imaging metrology tool 102 (or components thereof). For example, a recipe of the imaging metrology tool 102 may include, but is not limited to, an illumination wavelength, a detected wavelength of light emanating from the sample 104, a spot size or shape of illumination on the sample 104, an angle of incident illumination, a polarization of incident illumination, a polarization of collected light, a position of a beam of incident illumination on the sample 104, a position of the sample 104 with respect to a working distance of the imaging metrology tool 102 (e.g., a sample defocus), or the like.

Further, for the purposes of the present disclosure, the imaging metrology tool 102 may be suitable for performing any type of metrology or inspection measurements associated with a sample 104. For example, the imaging metrology tool 102 may further generate metrology measurements associated with images generated at any depth such as, but not limited to, overlay measurements, critical dimension (CD) measurements, film thickness measurements, film composition measurements, or the like. By way of another example, the imaging metrology tool 102 may generate defect inspection data and/or identify defects on the sample 104 based on images generated at any depth. In this way, the imaging metrology tool 102 may be characterized as an inspection tool.

The imaging metrology tool 102 may further generate an image of the sample 104 using any technique known in the art. In some embodiments, the imaging metrology tool 102 provides an image of an extended field of view (FOV) on the sample 104 on a two-dimensional detector. In some embodiments, the imaging metrology tool 102 provides an image of the sample 104 based on tightly focusing illumination onto the sample 104, imaging this illuminated spot onto a single-pixel detector and scanning the illumination across the sample 104 to build up a two-dimensional image.

It is contemplated herein that one of the one or more degrees of freedom may include, but is not required to include, sample defocus, which may be adjusted using various components such as, but not limited to, a sample stage or an objective lens in the imaging metrology tool 102 with an adjustable axial position. However, aberrations of the imaging metrology tool 102 are typically highly sensitive to sample defocus. As a result, adjusting the sample defocus alone to provide imaging at different sub-surface depths may induce aberrations and diminish a quality of an associated image.

Referring now to FIGS. 2A-2D, the impact of adjusting sample defocus on image quality as measured by the Strehl ratio is illustrated. In particular, FIGS. 2A-2D illustrate a configuration in which the sample 104 is formed from fused silica, an objective lens 202 of an imaging metrology tool 102 is 0.9, and imaging illumination has a spectrum centered at 190 nanometers (nm). However, it is to be understood that this configuration is provided merely for illustrative purposes and is not limiting on the present disclosure. It is further to be understood that the use of the Strehl ratio as a measure of imaging quality is merely an illustration and any metric or combination of metrics may be used to characterize optical quality of an imaging metrology tool 102 such as, but not limited to, a full-width of a point spread function, a modulation transfer function, or a depth of focus.

Figure 2B:
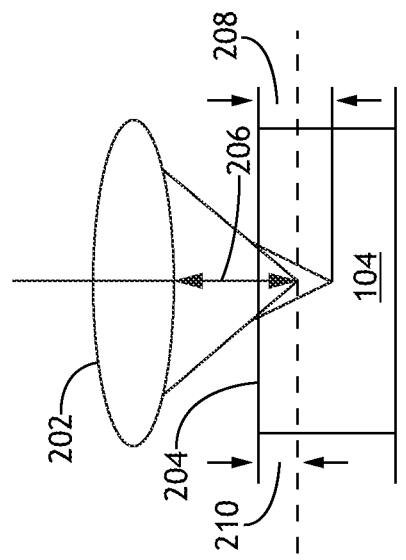
FIG. 2B is a conceptual view of the portion of the imaging metrology tool arranged for sub-surface imaging adjusting only the sample defocus, in accordance with one or more embodiments of the present disclosure.
Figure 2A:
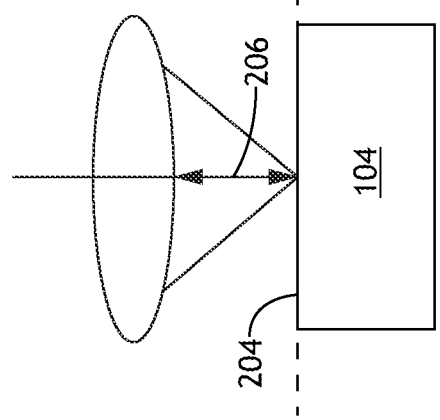
FIG. 2A is a conceptual view of a portion of the imaging metrology tool illustrating an objective lens arranged to provide imaging of a surface of a sample, in accordance with one or more embodiments of the present disclosure.

FIG. 2A is a conceptual view of a portion of the imaging metrology tool 102 illustrating an objective lens 202 arranged to provide imaging of a surface 204 of a sample 104, in accordance with one or more embodiments of the present disclosure. In this configuration, an object plane of the imaging metrology tool 102 is at the surface 204.

FIG. 2B is a conceptual view of the portion of the imaging metrology tool 102 arranged for sub-surface imaging at an imaging depth 206 of 3 micrometers (μm) by adjusting only the sample defocus 208 (e.g., a focal offset), in accordance with one or more embodiments of the present disclosure. In particular, FIG. 2B illustrates a sample defocus 208 of 1.7 μm required to provide an imaging depth 206 of 3 μm in the fused silica sample 104.

Figure 2C:
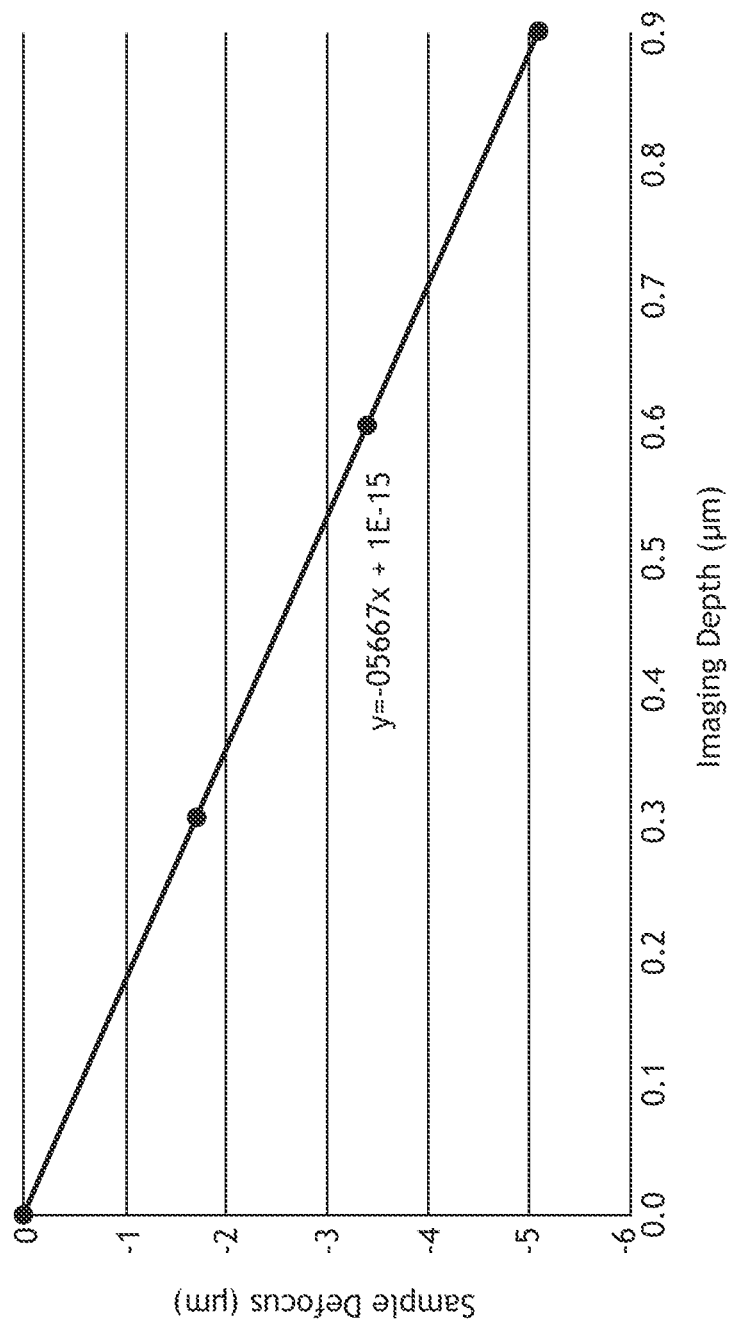
FIG. 2C is a plot of imaging depth as a function of sample defocus for the imaging metrology tool illustrated in FIGS. 2A and 2B, in accordance with one or more embodiments of the present disclosure.

FIG. 2C is a plot of imaging depth 206 as a function of sample defocus 208 for the imaging metrology tool 102 illustrated in FIGS. 2A and 2B, in accordance with one or more embodiments of the present disclosure. As shown in FIG. 2C, in this configuration, approximately 0.57 μm of sample defocus 208 is required for every 1 μm change of the imaging depth 206.

Figure 2D:
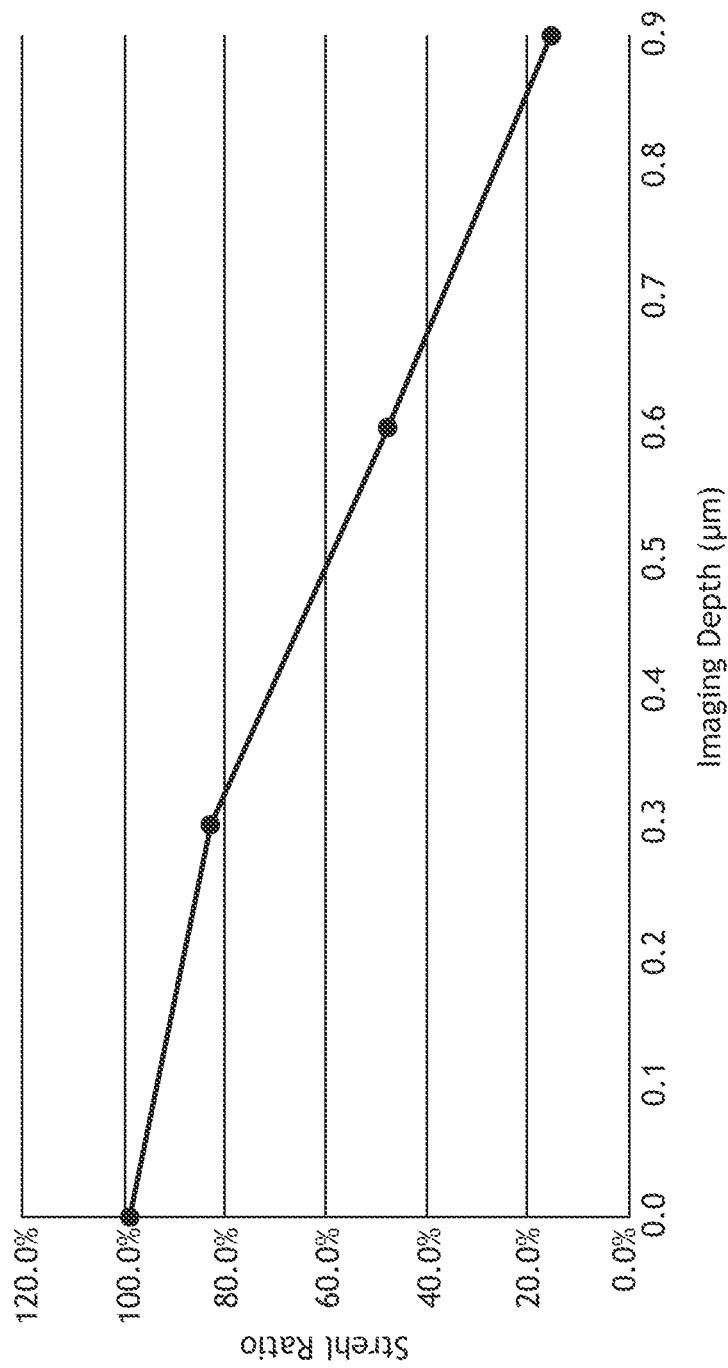
FIG. 2D is a plot of the Strehl ratio of the imaging metrology tool illustrated in FIGS. 2A and 2B as a function of the imaging depth, in accordance with one or more embodiments of the present disclosure.

FIG. 2D is a plot of the Strehl ratio of the imaging metrology tool 102 illustrated in FIGS. 2A and 2B as a function of the imaging depth 206, in accordance with one or more embodiments of the present disclosure. As shown in FIG. 2D, the Strehl ratio drops from nearly 100% for imaging at the surface 204 to around 15% for an imaging depth 206 of 9 μm. Accordingly, the imaging quality of such an imaging metrology tool 102 providing aberration-corrected imaging at one imaging depth 206 (e.g., at the surface 204 or a selected imaging depth 206) may be severely reduced as the imaging depth 206. This may in turn severely limit a useful range of imaging depths 206 of the imaging metrology tool 102 when the sample defocus 208 is the only degree of freedom available for adjustment.

It is contemplated herein that a depth-adjustable imaging system 100 providing one or more degrees of freedom for aberration correction may provide numerous benefits including aberration correction over a relatively wide range of imaging depths 206.

Referring again to FIGS. 1A-1F, various configurations of a depth-adjustable imaging system 100 are described in greater detail, in accordance with one or more embodiments of the present disclosure.

Figure 1B:
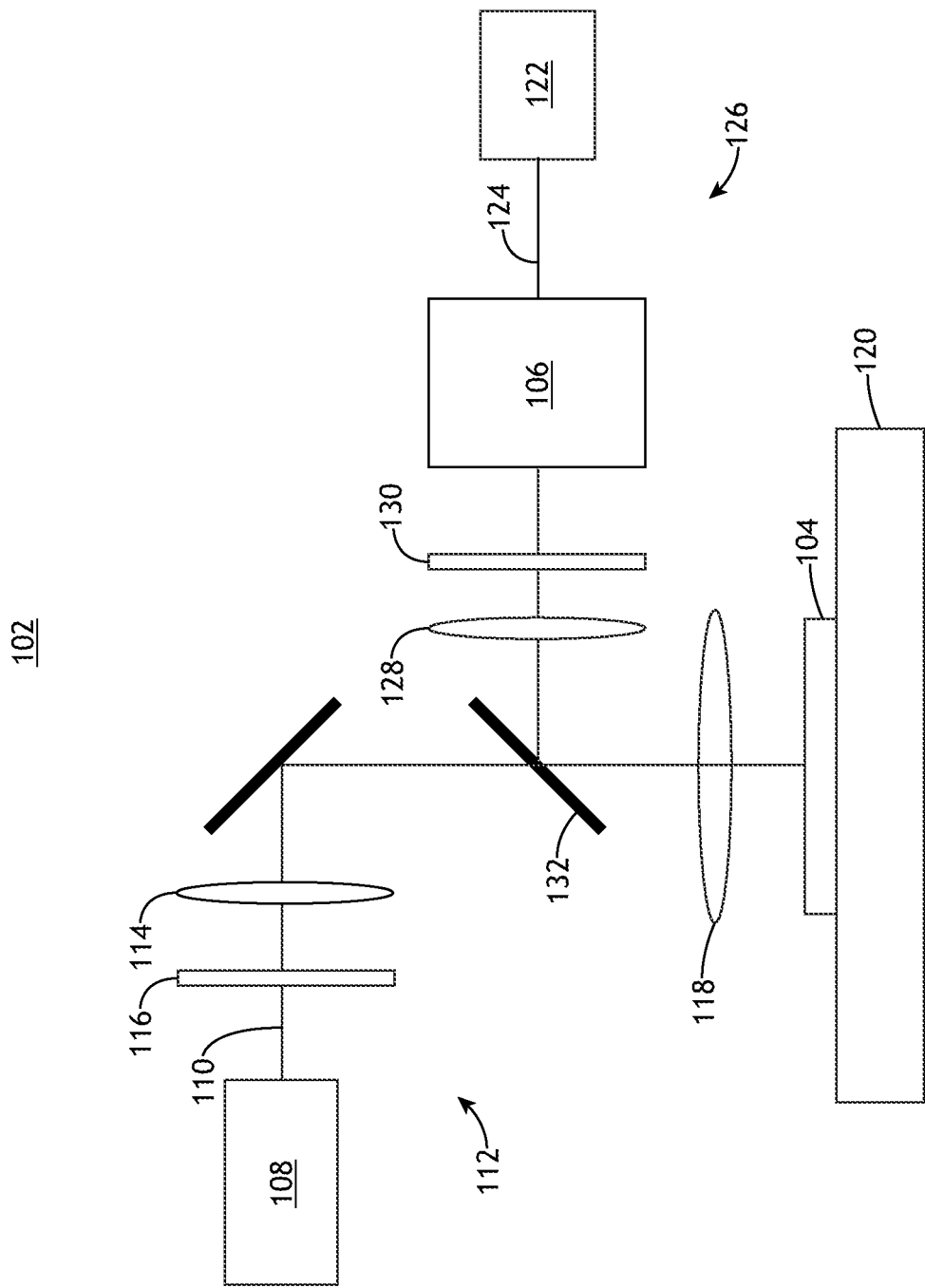
FIG. 1B is a conceptual view of a depth-adjustable imaging system, in accordance with one or more embodiments of the present disclosure.

FIG. 1B is a conceptual view of a depth-adjustable imaging system 100, in accordance with one or more embodiments of the present disclosure.

In some embodiments, the imaging metrology tool 102 includes an illumination source 108 configured to generate illumination 110, which may be in the form of one or more illumination beams (e.g., illumination lobes). The illumination 110 from the illumination source 108 may include any wavelength, range of wavelengths, or combinations of wavelengths including, but not limited to, ultraviolet (UV) radiation, visible radiation, or infrared (IR) radiation.

The illumination source 108 may include any type of illumination source suitable for providing illumination 110 for imaging the sample 104. In some embodiments, the illumination source 108 is a laser source. For example, the illumination source 108 may include, but is not limited to, one or more narrowband laser sources, a broadband laser source, a supercontinuum laser source, a white light laser source, or the like. In this regard, the illumination source 108 may provide illumination 110 having high coherence (e.g., high spatial coherence and/or temporal coherence). In some embodiments, the illumination source 108 includes a laser-sustained plasma (LSP) source. For example, the illumination source 108 may include, but is not limited to, an LSP lamp, an LSP bulb, or an LSP chamber suitable for containing one or more elements that, when excited by a laser source into a plasma state, may emit broadband illumination. In some embodiments, the illumination source 108 includes a lamp source. For example, the illumination source 108 may include, but is not limited to, an arc lamp, a discharge lamp, an electrode-less lamp, or the like. In this regard, the illumination source 108 may provide illumination 110 having low coherence (e.g., low spatial coherence and/or temporal coherence). Further, the illumination source 108 may provide the illumination 110 using free-space techniques and/or optical fibers.

In some embodiments, the illumination source 108 directs the illumination 110 to the sample 104 via an illumination pathway 112. The illumination pathway 112 may include one or more optical components suitable for modifying and/or conditioning the illumination 110 as well as directing the illumination 110 to the sample 104. In some embodiments, the illumination pathway 112 includes one or more illumination-pathway lenses 114 (e.g., to collimate the illumination 110, to relay pupil and/or field planes, or the like). In some embodiments, the illumination pathway 112 includes one or more illumination-pathway optics 116 to shape or otherwise control the illumination 110. For example, the illumination-pathway optics 116 may include, but are not limited to, one or more field stops, one or more pupil stops, one or more polarizers, one or more filters, one or more beam splitters, one or more diffusers, one or more homogenizers, one or more apodizers, one or more beam shapers, or one or more mirrors (e.g., static mirrors, translatable mirrors, scanning mirrors, or the like).

In some embodiments, the imaging metrology tool 102 includes an objective lens 118 to direct the illumination 110 onto the sample 104 (e.g., either in an extended FOV for two-dimensional imaging or as a focused FOV for spot-scanning imaging techniques). In some embodiments, the sample 104 is disposed on a sample stage 120 suitable for securing the sample 104 and further configured to position the sample 104 with respect to the imaging metrology tool 102. For example, referring to FIGS. 2A-2D, the sample stage 120 may adjust the sample defocus 208 to provide imaging at any selected imaging depth 206.

The illumination 110 may be directed to the sample 104 in any spatial or angular distribution. For example, the illumination 110 may be formed as a single illumination beam or multiple illumination beams. In the case of multiple illumination beams, each illumination beam may illuminate the sample with a tailored set of characteristics such as, but not limited to, angular distribution, wavelength, polarization, location of an illuminated spot on the sample 104, or a spatial extent of the illuminated spot (e.g., size, shape, or the like) on the sample 104. In this regard, the imaging metrology tool 102 may provide dipole illumination, rotated dipole illumination, quadrature illumination, rotated quadrature illumination, or the like.

The characteristics of the illumination 110 directed to the sample 104 may be controlled using any technique known in the art. In some embodiments, the illumination-pathway optics 116 include one or more elements to control the spatial or angular extent of the illumination 110. For instance, the illumination-pathway optics 116 may include one or more apertures at an illumination pupil plane to divide the illumination 110 from the illumination source 108 into the various illumination beams and/or one or more apertures at an illumination field plane to control the spatial extent of any of the illumination beams. In some embodiments, the illumination source 108 generates multiple illumination beams by providing light in two or more optical fibers, where light output from each optical fiber is an illumination beam. In some embodiments, the illumination source 108 generates multiple illumination beams by diffracting a light source into two or more diffraction orders, where the illumination beams are formed from at least some of the diffraction orders of the light source. Efficient generation of multiple illumination lobes through controlled diffraction is generally described in U.S. Pat. No. 11,118,903 issued on Sep. 14, 2021, titled Efficient Illumination Shaping for Scatterometry Overlay, which is incorporated herein by reference in its entirety.

In some embodiments, the imaging metrology tool 102 includes one or more detectors 122 configured to capture light or other radiation emanating from the sample 104 (e.g., collected light 124) through a collection pathway 126. The collection pathway 126 may include one or more optical elements suitable for modifying and/or conditioning the collected light 124 from the sample 104. In some embodiments, the collection pathway 126 includes one or more collection-pathway lenses 128 (e.g., to collimate the collected light 124, to relay pupil and/or field planes, or the like), which may include, but is not required to include, the objective lens 118. In some embodiments, the collection pathway 126 includes one or more collection-pathway optics 130 to shape or otherwise control the collected light 124. For example, the collection-pathway optics 130 may include, but are not limited to, one or more field stops, one or more pupil stops, one or more polarizers, one or more filters, one or more beam splitters, one or more diffusers, one or more homogenizers, one or more apodizers, one or more beam shapers, or one or more mirrors (e.g., static mirrors, translatable mirrors, scanning mirrors, or the like).

A detector 122 may be located at any selected location within the collection pathway 126. In some embodiments, the imaging metrology tool 102 includes a detector 122 at a field plane (e.g., a plane conjugate to the sample 104) to generate an image of the sample 104. In some embodiments, the imaging metrology tool 102 includes a detector 122 at a pupil plane (e.g., a diffraction plane) to generate a pupil image. In this regard, the pupil image may correspond to an angular distribution of light from the sample 104. For instance, diffraction orders associated with diffraction of the illumination 110 from the sample 104 may be imaged or otherwise observed in the pupil plane. In a general sense, a detector 122 may capture any combination of reflected (or transmitted), scattered, or diffracted light from the sample 104.

The imaging metrology tool 102 may generally include any number or type of detectors 122 suitable for capturing light from the sample 104 indicative of overlay. In some embodiments, the detector 122 includes one or more detectors 122 suitable for characterizing a static sample. In this regard, the imaging metrology tool 102 may operate in a static mode in which the sample 104 is static during a measurement. For example, a detector 122 may include a two-dimensional pixel array such as, but not limited to, a charge-coupled device (CCD) or a complementary metal-oxide semiconductor (CMOS) device. In this regard, the detector 122 may generate a two-dimensional image (e.g., a field-plane image or a pupil-plane image) in a single measurement. In some embodiments, the detector 122 includes one or more detectors 122 suitable for characterizing a moving sample (e.g., a scanned sample). In this regard, the imaging metrology tool 102 may operate in a scanning mode in which the sample 104 is scanned with respect to a measurement field during a measurement. For example, the detector 122 may include, but is not limited to, a 2D pixel array or a time-delay integration (TDI) detector.

The illumination pathway 112 and the collection pathway 126 of the imaging metrology tool 102 may be oriented in a wide range of configurations suitable for illuminating the sample 104 with the illumination 110 and collecting light emanating from the sample 104 in response to the incident illumination 110. For example, as illustrated in FIG. 1B, the imaging metrology tool 102 may include a beamsplitter 132 oriented such that a common objective lens 118 may simultaneously direct the illumination 110 to the sample 104 and capture the collected light 124 from the sample 104. By way of another example, the illumination pathway 112 and the collection pathway 126 may contain non-overlapping optical paths.

Figure 1C:
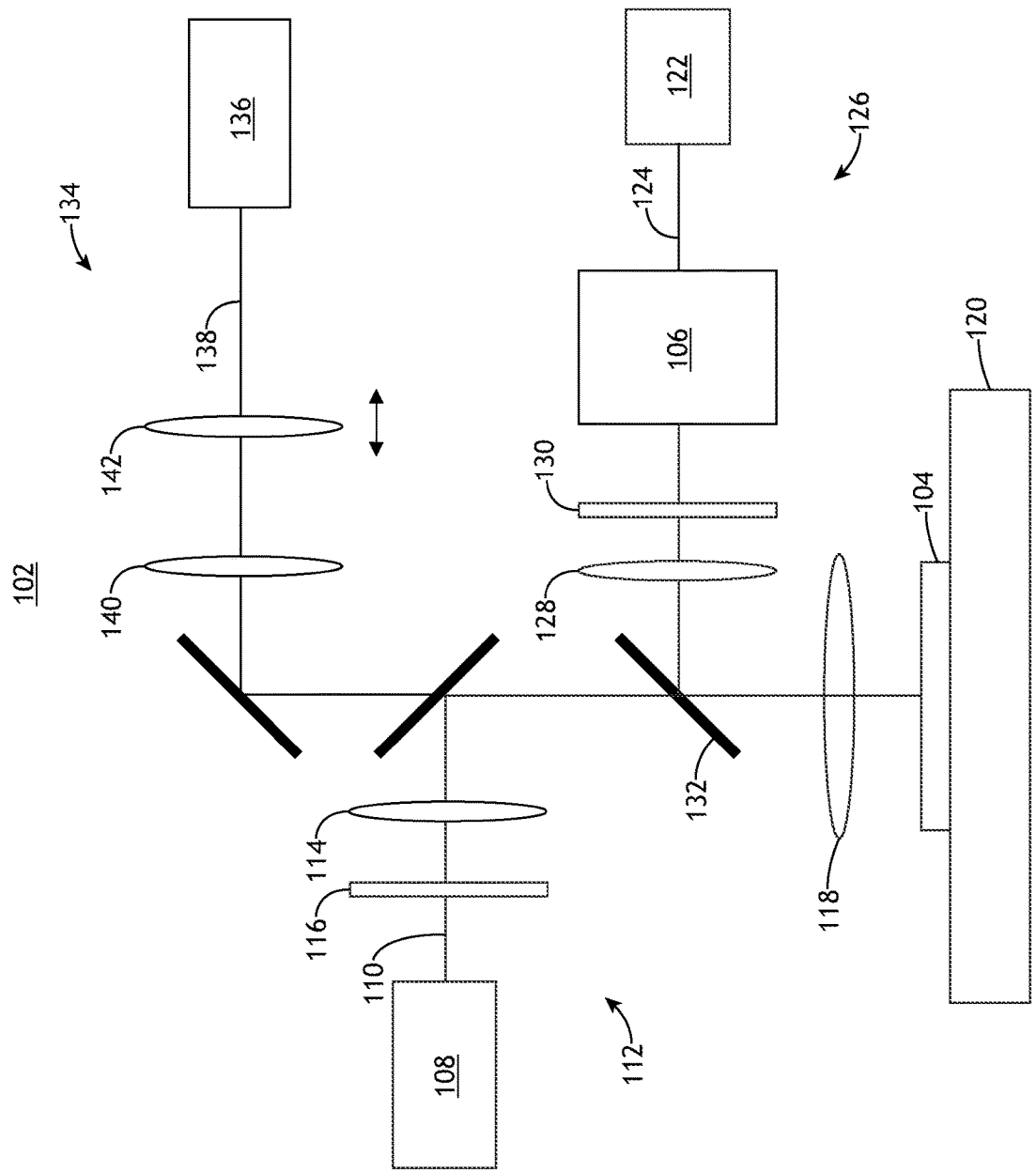
FIG. 1C is a conceptual view of the imaging metrology tool illustrated in FIG. 1B with the addition of a focus controller, in accordance with one or more embodiments of the present disclosure.

Referring now to FIG. 1C, positioning of the sample 104 with respect to the imaging metrology tool 102 is described in greater detail in accordance with one or more embodiments of the present disclosure. It is contemplated herein that a position of a focal plane in the sample 104 (e.g., an object plane or an imaging plane) may be adjusted using various techniques including, but not limited to, movement of the sample 104 with the sample stage 120, movement of the objective lens 118, and/or adjustments to one or more optical elements in the collection pathway 126. However, it may be desirable to monitor and/or control a working distance (e.g., a separation between the sample 104 and one or more components of the imaging metrology tool 102 such as, but not limited to, the objective lens 202). In this way, the sample defocus 208 may be monitored and/or controlled.

In some embodiments, the depth-adjustable imaging system 100 includes a focus controller 134 suitable for determining and/or controlling the sample defocus 208 (e.g., working distance and/or a position of the sample 104 more generally). In some embodiments, the focus controller 134 directs a focus-monitoring beam from an illumination source to the sample 104 and determines a position and/or orientation of the sample 104 based on interaction of the focus-monitoring beam with the sample 104.

FIG. 1C is a conceptual view of the imaging metrology tool 102 illustrated in FIG. 1B with the addition of a focus controller 134, in accordance with one or more embodiments of the present disclosure. In FIG. 1C, the focus controller 134 includes a focus illumination source 136 configured to generate a focus-monitoring beam 138, and various focus-monitor optics 140 to direct the focus-monitoring beam 138 to the sample 104 either directly or through the objective lens 118 (as illustrated in FIG. 1C). The position and/or orientation of the sample 104 may then be determined based on properties of a reflection of the focus-monitoring beam 138 captured by a detector (not shown).

As a non-limiting illustration, the focus-monitor optics 140 (and the objective lens 202 if in the optical path of the focus-monitoring beam 138) may focus the focus-monitoring beam 138 on the sample 104. In this configuration, deviations of the working distance will result in deviations of the divergence of the reflected focus-monitoring beam 138, which may be measured and correlated to provide a measurement of the working distance.

In some embodiments, as also illustrated in FIG. 1C, the focus controller 134 includes at least one adjustable focusing optic 142 suitable for adjusting a nominal working distance at which the focus-monitoring beam 138 is focused on the sample 104. In this way, the focus controller 134 may apply a constant focus offset to allow imaging at sub-surface inspection depths.

In some embodiments, the focus controller 134 is further coupled to one or more components suitable for adjusting the working distance such as, but not limited to, the sample stage 120 or the objective lens 202. In this way, the focus controller 134 may operate as an auto-focus system suitable for controlling (e.g., through feedback) the working distance of the sample 104 with respect to the imaging metrology tool 102 or the position/orientation of the sample 104 more generally.

It is to be understood, however, that FIG. 1C and the associated description are provided solely for illustrative purposes and should not be interpreted as limiting. Rather, the focus controller 134 may operate using any technique known in the art and may include dedicated components and/or may be integrated with additional components of the depth-adjustable imaging system 100.

Figure 1D:
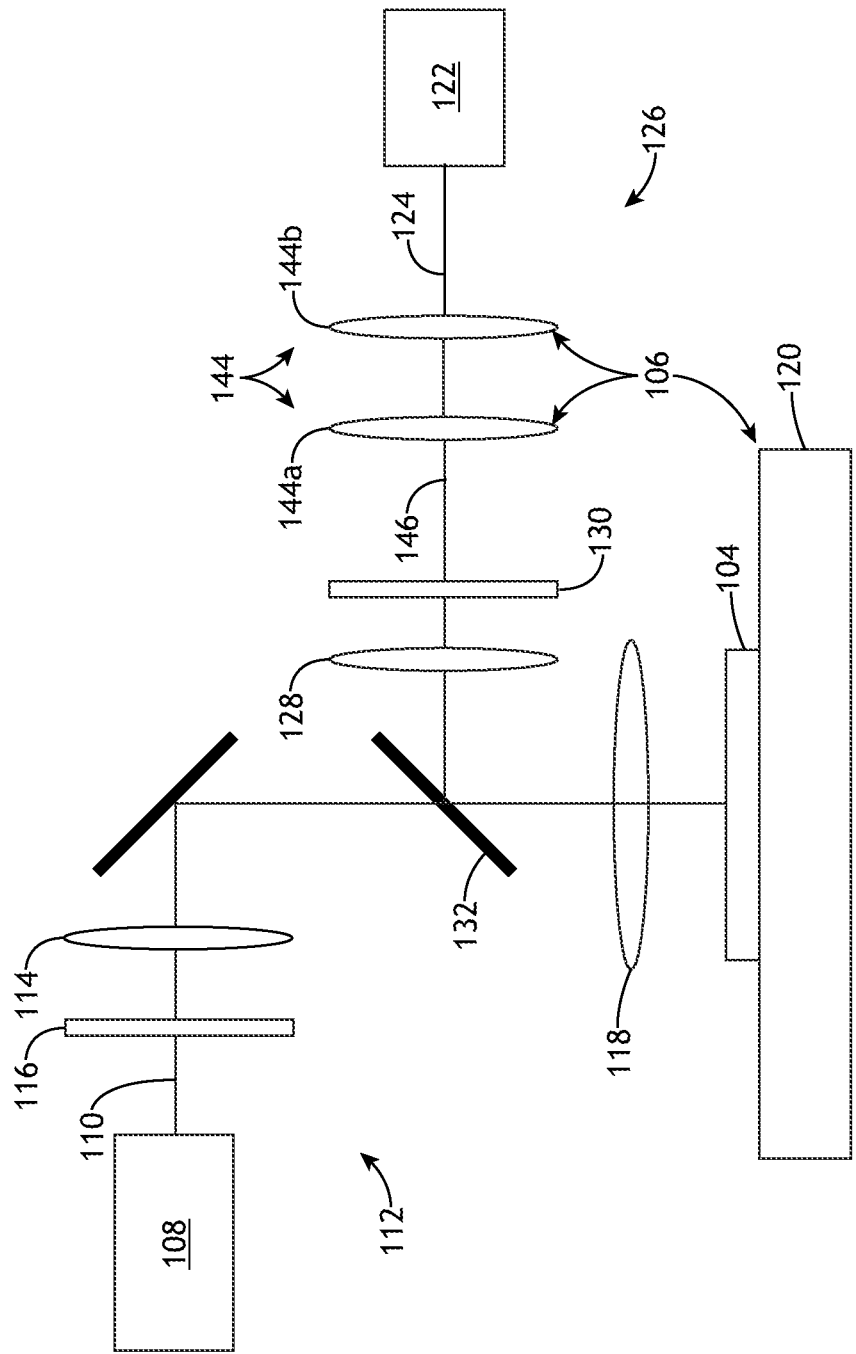
FIG. 1D is a conceptual view of an imaging metrology tool including aberration-controlling components formed as two adjustable lenses, in accordance with one or more embodiments of the present disclosure.
Figure 1E:
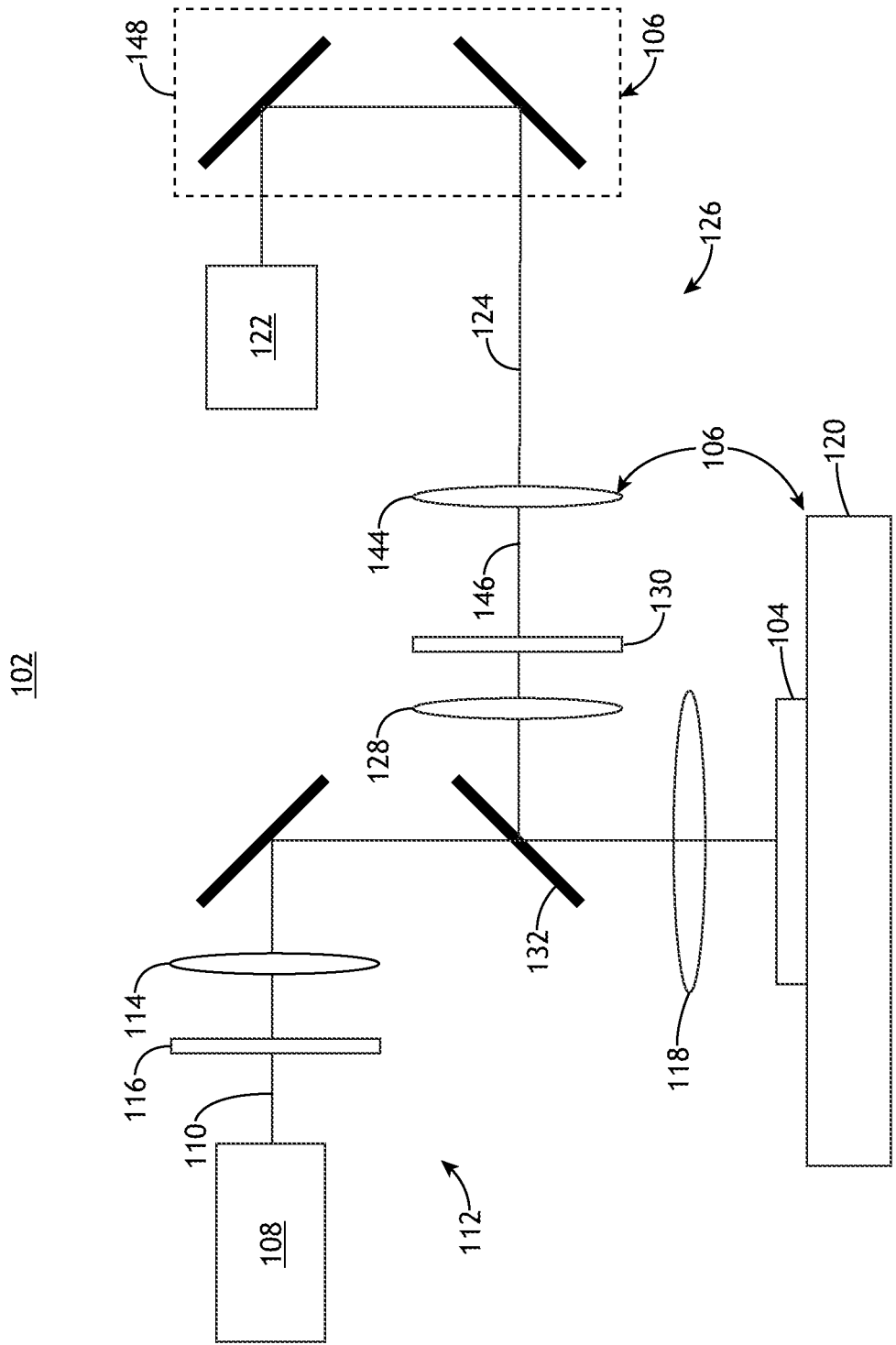
FIG. 1E is a conceptual view of an imaging metrology tool including aberration-controlling components including an adjustable lens and adjustable mirror group, in accordance with one or more embodiments of the present disclosure.

Referring now to FIGS. 1D-1F, various aspects of the aberration-controlling components 106 providing aberration-corrected imaging at multiple depths are described in greater detail, in accordance with one or more embodiments of the present disclosure.

The aberration-controlling components 106 may be formed as, or otherwise integrated with any components of the imaging metrology tool 102 including, but not limited to, the collection pathway 126. For example, as illustrated in FIG. 1B, the aberration-controlling components 106 may be distinct elements. By way of another example, the aberration-controlling components 106 may form or be otherwise integrated with the collection-pathway lenses 128 and/or collection-pathway optics 130 illustrated in FIG. 1B.

The aberration-controlling components 106 may further include any type of optical component that is adjustable according to at least one degree of freedom. For example, the aberration-controlling components 106 may include one or more optical elements for which at least a position or an orientation is adjustable (e.g., position along an axis, rotation about an axis, or the like). As an illustration, the aberration-controlling components 106 may include one or more focusing elements (e.g., lenses, lens groups, delay lines, or the like) having an adjustable position and/or orientation. By way of another example, the aberration-controlling components 106 may include one or more phase plates (e.g., flat, parallel plates inserted at a pupil plane), which may introduce defocus terms. Further, in a general sense, the imaging metrology tool 102 may include any number or combination of aberration-controlling components 106 suitable for providing one or more degrees of freedom for aberration control.

Referring now to FIGS. 1D-5, various non-limiting illustrations of the imaging metrology tool 102 including aberration-controlling components 106 providing three or more degrees of freedom for aberration-corrected imaging at various imaging depths 206 are described. In particular, FIGS. 1D, 1E and 3-5 illustrate aberration-controlling components 106 including optical elements having adjustable positions and FIG. 1F illustrates aberration-controlling components 106 including phase plates. Further, although not explicitly illustrated, any of the illustrations of the imaging metrology tool 102 may include a focus control system such as, but not limited to, the focus controller 134 illustrated in FIG. 1C. However, as described throughout, it is to be understood that the aberration-controlling components 106 are not limited to providing three or more degrees of freedom. Rather, in some embodiments, the aberration-controlling components 106 provide one or more degrees of freedom.

FIG. 1D is a conceptual view of an imaging metrology tool 102 including aberration-controlling components 106 formed as two adjustable lenses 144, in accordance with one or more embodiments of the present disclosure.

It is contemplated herein that a position and/or a rotation of an adjustable lens 144 may correspond to a degree of freedom of the depth-adjustable imaging system 100 suitable for providing aberration-corrected imaging at multiple imaging depths 206. In this way, adjustments of a particular adjustable lens 144 along or with respect to one or more axes may be associated with one or more degrees of freedom suitable for aberration control.

In some embodiments, the aberration-controlling components 106 include one or more adjustable lenses 144 in the collection pathway 126 in which at least one of a position or a rotation (e.g., orientation) are adjustable. For example, a position of an adjustable lens 144 may be adjustable along an axial direction (e.g., along an optical axis of the collected light 124 through the collection pathway 126) and/or along one or more transverse directions (e.g., directions orthogonal to the axial direction). By way of another example, a rotation of an adjustable lens with respect to one or more rotational axes may be adjusted. In this way, the tip and/or tilt of the adjustable lens may be controlled.

In particular, FIG. 1D illustrates a configuration including a first adjustable lens 144a and a second adjustable lens 144b, where axial of the first adjustable lens 144a and the second adjustable lens 144b positions (e.g., positions along an optical axis 146) correspond to two degrees of freedom for aberration control. FIG. 1D additionally illustrates a configuration in which an axial position of the sample 104 is adjustable with a sample stage 120 such that the sample defocus 208 may correspond to a third degree of freedom for aberration control. Further, it is to be understood that any particular adjustable lenses 144 may be formed as a single lens or as a compound lens (e.g., lens groups).

It is contemplated herein that the use of three degrees of freedom for aberration control as illustrated in FIG. 1D may allow for aberration correction while maintaining a constant imaging magnification for various imaging depths 206. For example, in this configuration, the sample 104 may be located within a high numerical aperture (NA) space of the imaging metrology tool 102 since it is receiving highly convergent light from the objective lens 118. Adjusting the sample defocus 208 (e.g., axial position of the sample 104) may compensate for spherical aberrations (e.g., corresponding to Zernike polynomials Z9, Z16, and/or Z25) and dispersion in the sample 104. The adjustable lenses 144 may be located in a low NA space (e.g., in a portion of the imaging metrology tool 102 in which the collected light 124 has relatively lower convergence or divergence). Adjusting these two adjustable lenses 144 may then allow for introduction of a pure defocus term (e.g., corresponding to Zernike polynomial Z4) as well as a magnification term to provide for consistent magnification on the detector 122.

Figure 3:
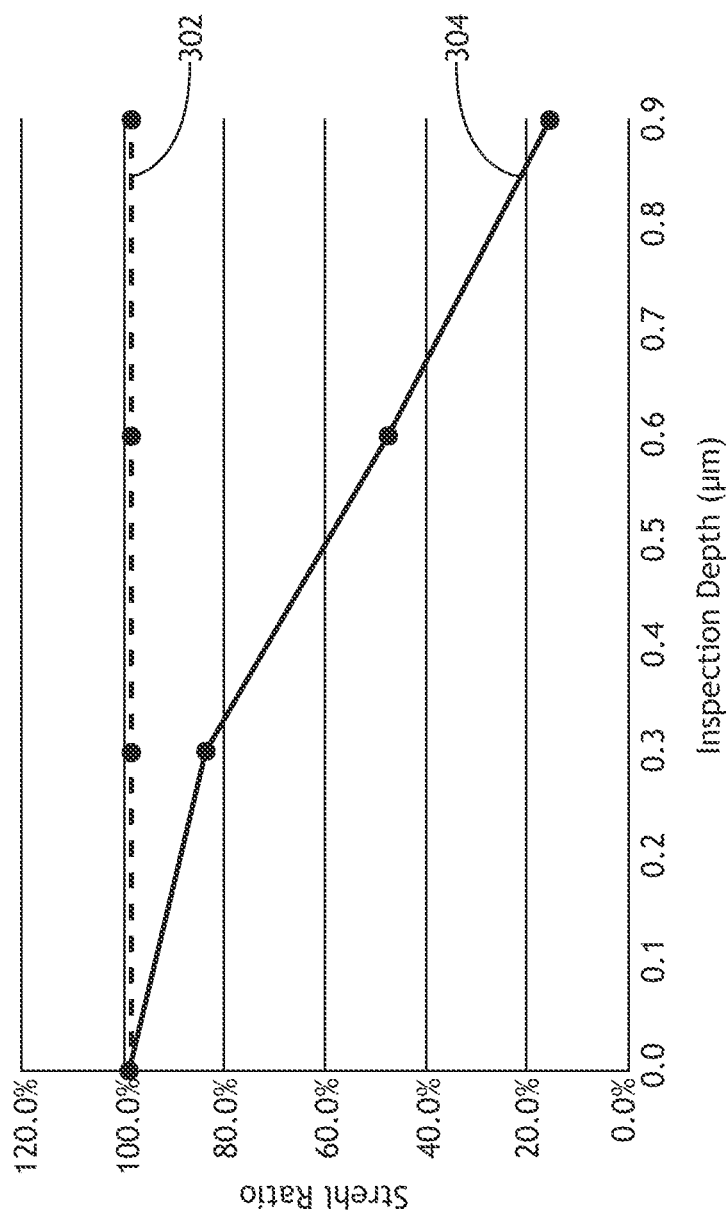
FIG. 3 is a plot illustrating the Strehl ratio as a function of imaging depth for different aberration-correction schemes, in accordance with one or more embodiments of the present disclosure.
Figure 4:
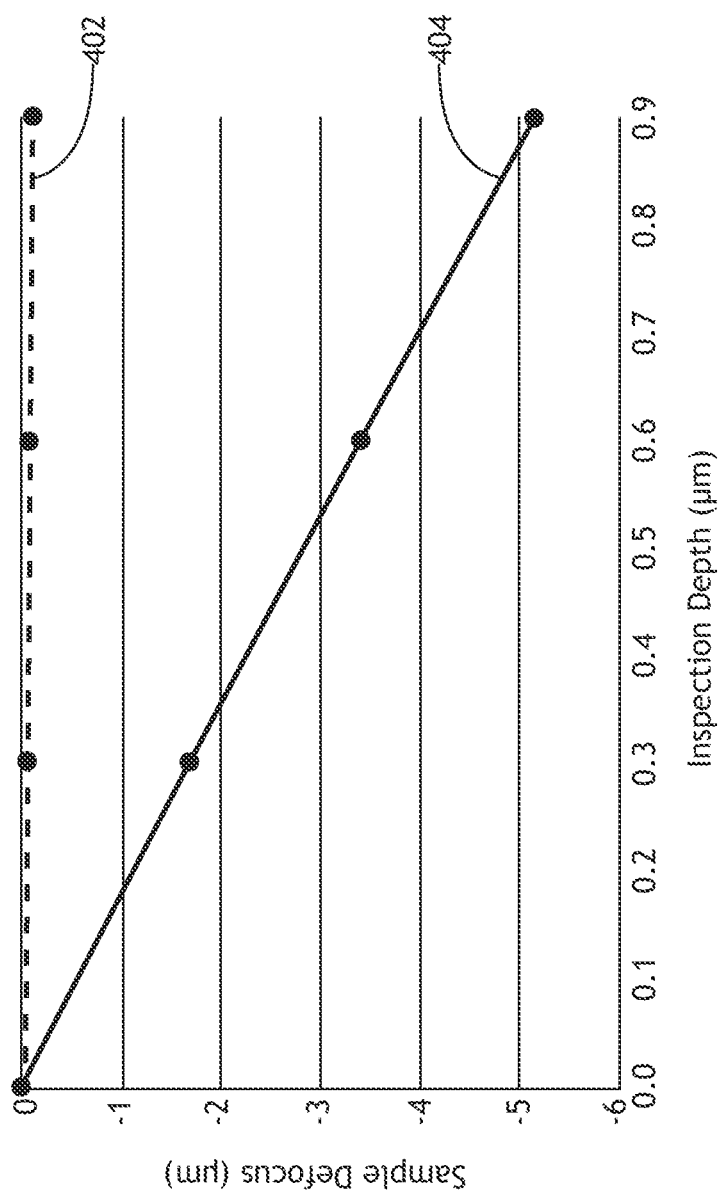
FIG. 4 is a plot of sample defocus required for aberration-corrected imaging, in accordance with one or more embodiments of the present disclosure.
Figure 5:
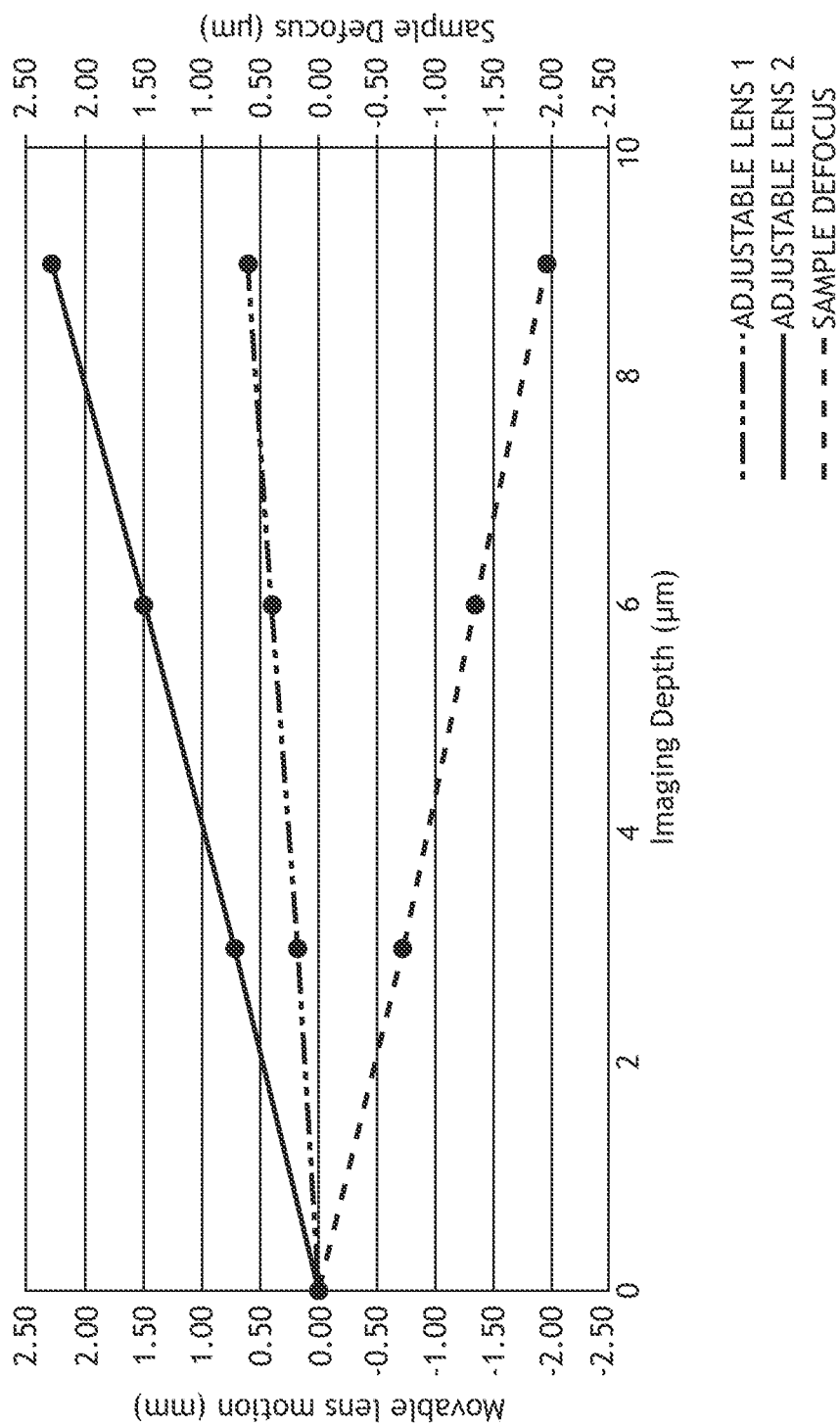
FIG. 5 is a plot of the relative configurations of aberration-controlling components of the imaging metrology tool illustrated in FIG. 1C, in accordance with one or more embodiments of the present disclosure.

FIGS. 3-5 illustrate aberration-corrected imaging at multiple imaging depths 206 using an imaging metrology tool 102 configured as illustrated in FIG. 1D with three degrees of freedom for aberration control. In particular, FIGS. 3-5 are based on the same configuration of the imaging metrology tool 102 and the sample 104 as was used for FIGS. 2A-2D to show improvements associated with the use of three or more degrees of freedom for aberration control.

FIG. 3 is a plot illustrating the Strehl ratio as a function of imaging depth 206 for different aberration-correction schemes, in accordance with one or more embodiments of the present disclosure. In particular, FIG. 3 includes data 302 associated with aberration correction using three degrees of freedom illustrating that the Strehl ratio may be maintained within approximately 1% of a nominal value at the surface for at least a 9 μm depth range by adjusting the aberration correction using three degrees of freedom. FIG. 3 also includes the data 304 from FIG. 2 associated with aberration correction using sample defocus 208 as a single degree of freedom to highlight the substantive improvement provided by multiple degrees of freedom for aberration correction.

Referring now to FIG. 4, it is contemplated herein that an imaging metrology tool 102 with one or more degrees of freedom for aberration control may further reduce the amount of sample defocus 208 variation (e.g., working distance variation) required to image at a range of imaging depths 206. This may have various benefits including, but not limited to, limiting an operational range of a focusing system. As an illustration in the context of the focus controller 134 in FIG. 1C, the adjustable focusing optic 142 may be adjustable to tightly focus the focus-monitoring beam 138 on the sample 104 at a range of axial positions (e.g., for varying amounts of sample defocus 208). Accordingly, reducing the amount of sample defocus 208 required to image at a range of imaging depths 206 may relax the requirements of the focus controller 134.

FIG. 4 is a plot of sample defocus 208 required for aberration-corrected imaging, in accordance with one or more embodiments of the present disclosure. In particular, FIG. 4 illustrates the ability to limit sample defocus 208 in this particular configuration to sub-micron variations over a 9 μm range of imaging depths 206 when providing aberration correction with three degrees of freedom as illustrated in FIG. 1D. FIG. 4 further includes the data from FIG. 2C associated with aberration correction using sample defocus 208 as a sole degree of freedom for aberration control to further highlight the substantive improvement provided by multiple degrees of freedom for aberration correction. As illustrated in FIG. 4, As a result, the use of multiple degrees of freedom for aberration control may substantially reduce the operational range of the focus controller 134 (e.g., a range of motion of the adjustable focusing optic 142) for imaging at a range of imaging depths 206.

Referring now to FIG. 5, it is contemplated herein that the relative configurations of the various aberration-controlling components 106 (e.g., associated with the three or more degrees of freedom in this non-limiting example) suitable for aberration-corrected imaging within a selected range of depths in a particular sample 104 may generally be based on the characteristics of the sample 104 (e.g., the refractive index, effective refractive index, or the like) as well as the characteristics of the imaging metrology tool 102 (e.g., the wavelength of the illumination 110, the NA of the objective lens 118, or the like).

However, these relative configurations of the aberration-controlling components 106 may be determined prior to run-time. In this way, calibrated configurations for imaging a particular sample 104 at a particular range of imaging depths 206 with a particular imaging metrology tool 102 (or configuration thereof) may be generated. This may be particularly useful for, but is not limited to, rapid adjustment of the imaging metrology tool 102 (e.g., the aberration-controlling components 106) during run-time for efficiently imaging at various depths.

As an illustration in the context of FIG. 1D, adjustments to the adjustable lenses 144 may generally impact the magnification and defocus of the imaging metrology tool 102. FIG. 5 is a plot of the relative configurations of aberration-controlling components 106 of the imaging metrology tool 102 illustrated in FIG. 1C, in accordance with one or more embodiments of the present disclosure. In particular, FIG. 5 illustrates relative positional adjustments of the sample stage 120 to control sample defocus 208 (e.g., a first degree of freedom for aberration control) and relative axial positional adjustments of the adjustable lenses 144 (e.g., second and third degrees of freedom for aberration control), where an imaging depth 206 of 0 μm at a surface corresponds to a nominal or reference position.

It is contemplated herein that there may be some coupling between magnification and defocus for the adjustable lenses 144 such that adjustments to the positions of either the first adjustable lens 144a or the second adjustable lens 144b may modify both the magnification and defocus. However, there may be a fixed relationship between magnification and defocus for each of the adjustable lenses 144. For instance, in the particular configuration illustrated in FIG. 5, adjustments to the sample defocus 208 of a first of the adjustable lenses 144 may be linearly proportional to the imaging depth 206. The adjustments to a second of the adjustable lenses 144 (e.g., a relative position between the adjustable lenses 144) may then ensure a constant imaging magnification. For instance, FIG. 5 illustrates a relative motion between the adjustable lenses 144 of 1:3.7 to ensure the constant imaging magnification under these conditions.

It is further contemplated herein that all or part of the aberration-controlling components 106 may be formed from reflective optics. Referring now to FIG. 1E, FIG. 1E is a conceptual view of an imaging metrology tool 102 including aberration-controlling components 106 including an adjustable lens 144 and adjustable mirror group 148, in accordance with one or more embodiments of the present disclosure. In particular, the adjustable mirror group 148 may include two mirrors operating as a delay line to effectively adjust a relative position of the detector 122 in the collection pathway 126. As such, the configuration of the imaging metrology tool 102 illustrated in FIG. 1E may correspond to the configuration of FIG. 1D in which the second adjustable lens 144b is replaced with the adjustable mirror group 148.

Referring generally to FIGS. 1D and 1E, it is to be understood that the configurations illustrated in FIGS. 1D and 1E are solely for illustrative purposes and should not be interpreted as limiting. Rather, it is to be understood that any configuration of the imaging metrology tool 102 including aberration-controlling components 106 with two or more degrees of freedom for aberration control is within the spirit and scope of the present disclosure. As another illustration, in some embodiments, the aberration-controlling components 106 includes a position of the detector 122 (e.g., an axial position of the detector 122).

Referring now to FIG. 1F, FIG. 1F is a conceptual view of an imaging metrology tool 102 with aberration-controlling components 106 including a phase plate 150 at a pupil plane 152, in accordance with one or more embodiments of the present disclosure. In this configuration, the phase plate 150 may introduce a defocus term (e.g., corresponding to a Zernike polynomial Z4). It is contemplated herein that a thickness of the phase plate 150 may thus correspond to a degree of freedom suitable for aberration control for imaging at multiple imaging depths 206. In particular, different phase plates 150 of varying thickness may be inserted to introduce different amounts of defocus to provide aberration-corrected imaging at different imaging depths 206.

In some embodiments, a phase plate 150 has a spatially-varying thickness across the pupil plane 152 to compensate for aberrations other than defocus (e.g., aberrations corresponding to Zernike polynomials other than Z4). In this way, a thickness profile of the phase plate 150 along any particular direction may correspond to a degree of freedom for aberration control. As an illustration, a phase plate 150 with a thickness profile that varies along two dimensions across the pupil plane 152 (e.g., an X direction and a Y direction) may provide two degrees of freedom for aberration control. Accordingly, in some embodiments, aberration-controlling components 106 providing three degrees of freedom for aberration control may include a single phase plate 150 with a 2D spatial thickness profile across the pupil plane 152 and sample defocus 208 (e.g., as adjusted by the sample stage 120, the objective lens 118 position, or the like).

In some embodiments, the imaging metrology tool 102 includes at least one component selector (not shown) to selectively insert one or more phase plates 150 into the collection pathway 126 (e.g., into at least one pupil plane 152). For example, a component selector may include, but is not limited to, a rotating wheel mount, a linear mount, or the like having multiple mounting positions for multiple phase plates 150. In this way, aberration-corrected imaging at various imaging depths 206 may be achieved at least in part by selectively inserting one or more phase plates 150 into the collection pathway 126 of the imaging metrology tool 102.

Referring now generally to FIGS. 1C-5, it is to be understood that FIGS. 1C-5 are provided solely for illustrative purposes and should not be interpreted as limiting. For example, the depth-adjustable imaging system 100 may include aberration-controlling components 106 designed to provide aberration control across a range of imaging depths 206 based on one or two degrees of freedom. For example, aberration-controlling components 106 providing one degree of freedom for aberration-correction suitable for aberration-corrected imaging across the range of imaging depths 206 may provide a defocus term associated with the imaging system (e.g., associated with aberrations characterized by a Zernike Z4 polynomial). In some cases, the aberration-controlling components 106 may further provide, but are not required to provide, a consistent magnification across the range of imaging depths 206. By way of another example, aberration-controlling components 106 providing one degree of freedom for aberration-correction suitable for aberration-corrected imaging across the range of imaging depths 206 may provide a defocus term associated with the imaging system and sample defocus 208.

It is further contemplated herein that any of the particular aberration-controlling components 106 used to provide three degrees of freedom illustrated in FIGS. 1C-5 (e.g., the sample stage 120, the adjustable lenses 144, the phase plate 150, or the like) may also be used in a configuration providing different numbers of degrees of freedom such as, but not limited to, one degree of freedom, two degrees of freedom, or four or more degrees of freedom.

Referring again to FIG. 1A, additional components of the depth-adjustable imaging system 100 are described in greater detail in accordance with one or more embodiments of the present disclosure.

In another embodiment, the depth-adjustable imaging system 100 includes a controller 154 communicatively coupled to the imaging metrology tool 102 and/or any components therein.

In another embodiment, the controller 154 includes one or more processors 156. For example, the one or more processors 156 may be configured to execute a set of program instructions maintained in a memory device 158, or memory. The one or more processors 156 of a controller 154 may include any processing element known in the art. In this sense, the one or more processors 156 may include any microprocessor-type device configured to execute algorithms and/or instructions.

The one or more processors 156 of a controller 154 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 156 may include any device configured to execute algorithms and/or instructions (e.g., program instructions stored in memory). In one embodiment, the one or more processors 156 may be embodied as a desktop computer, mainframe computer system, workstation, image computer, parallel processor, networked computer, or any other computer system configured to execute a program configured to operate or operate in conjunction with the depth-adjustable imaging system 100, as described throughout the present disclosure. Moreover, different subsystems of the depth-adjustable imaging system 100 may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present disclosure may be carried out by a single controller or, alternatively, multiple controllers. Additionally, the controller 154 may include one or more controllers housed in a common housing or within multiple housings. In this way, any controller or combination of controllers may be separately packaged as a module suitable for integration into the depth-adjustable imaging system 100.

The memory device 158 may include any storage medium known in the art suitable for storing program instructions executable by the associated one or more processors 156. For example, the memory device 158 may include a non-transitory memory medium. By way of another example, the memory device 158 may include, but is not limited to, a read-only memory (ROM), a random-access memory (RAM), a magnetic or optical memory device (e.g., disk), a magnetic tape, a solid-state drive and the like. It is further noted that the memory device 158 may be housed in a common controller housing with the one or more processors 156. In one embodiment, the memory device 158 may be located remotely with respect to the physical location of the one or more processors 156 and the controller 154. For instance, the one or more processors 156 of the controller 154 may access a remote memory (e.g., server), accessible through a network (e.g., internet, intranet and the like).

In this way, the controller 154 may direct (e.g., through control signals) or receive data from any components of the depth-adjustable imaging system 100 including, but not limited to, the detector 122 or any of the aberration-controlling components 106. The controller 154 may further be configured to perform any of the various process steps described throughout the present disclosure such as, but not limited to, determining configurations of the aberration-controlling components 106 suitable for providing aberration-corrected imaging for a particular sample 104 at a selected range of imaging depths 206, receiving images from the detector 122, or generating inspection and/or metrology data associated with the sample 104 based on the images.

In one embodiment, the depth-adjustable imaging system 100 includes a user interface 160 communicatively coupled to the controller 154. In one embodiment, the user interface 160 may include, but is not limited to, one or more desktops, laptops, tablets, and the like. In another embodiment, the user interface 160 includes a display used to display data of the depth-adjustable imaging system 100 to a user. The display of the user interface 160 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 160 is suitable for implementation in the present disclosure. In another embodiment, a user may input selections and/or instructions responsive to data displayed to the user via a user input device of the user interface 160.

Figure 6:
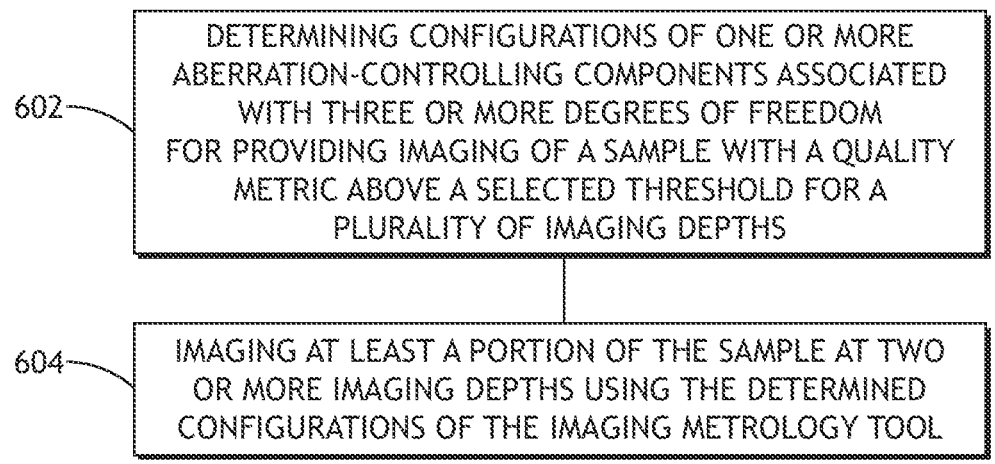
FIG. 6 is a flow diagram illustrating steps performed in a method for aberration-corrected imaging at multiple depths, in accordance with one or more embodiments of the present disclosure.

Referring now to FIG. 6, FIG. 6 is a flow diagram illustrating steps performed in a method 600 for aberration-corrected imaging at multiple depths, in accordance with one or more embodiments of the present disclosure. Applicant notes that the embodiments and enabling technologies described previously herein in the context of the depth-adjustable imaging system 100 should be interpreted to extend to the method 600. It is further noted, however, that the method 600 is not limited to the architecture of the depth-adjustable imaging system 100.

In some embodiments, the method 600 includes a step 602 of determining configurations of one or more aberration-controlling components associated with one or more degrees of freedom for providing imaging of a sample with a quality metric above a selected threshold for a plurality of imaging depths. In some embodiments, the method 600 includes a step 604 of imaging at least a portion of the sample at two or more imaging depths using the determined configurations of the imaging metrology tool.

For example, the aberration-controlling components of the step 602 may include, but are not limited to, the aberration-controlling components 106 of the depth-adjustable imaging system 100. In this way, the degrees of freedom associated with the aberration-corrected imaging at multiple imaging depths may include, but are not limited to, positions and/or orientations of components in an imaging tool (e.g., lenses, mirrors, or the like). Further, as described with respect to the depth-adjustable imaging system 100, the aberration-controlling components 106 may include a phase plate 150 located at a pupil plane 152 such that the degrees of freedom may be associated with thickness profiles along one or more directions.

It is contemplated herein that the step 602 may be based on any imaging quality metric known in the art including, but not limited to, the Strehl ratio, a full-width of a point spread function, a modulation transfer function, or a depth of focus.

It is further contemplated herein that the step 602 may be carried out using any of a variety of techniques. In some embodiments, the step 602 is carried out using simulations of an imaging tool (e.g., an imaging metrology tool 102) and/or a particular sample. For example, aberrations of an optical system may be, but are not required to be, simulated or otherwise modeled using ray tracing techniques, electromagnetic analysis techniques, or a combination thereof. In some embodiments, the step 602 is carried out using measurements of an imaging tool with a particular sample.

The step 602 may be further be carried out at any time. In some embodiments, the step 602 is carried out prior to run-time. In this way, the step 604 of aberration-corrected imaging at multiple imaging depths may be carried out efficiently based on the pre-determined configurations. In some embodiments, the step 602 is carried out during run-time. In this way, the method 600 may be flexibly implemented without the need for prior calibration.

In some embodiments, the method 600 is implemented in the context of inspection. For example, the method 600 may further include identifying defects on the sample based on the images at any of the two or more imaging depths. Further, the method may include controlling one or more process tools (e.g., lithography tools, etch tools, additional metrology tools, or the like) based on the identified defects using any suitable control technique (e.g., feedback control, feed-forward control, or the like).

In some embodiments, the method 600 is implemented in the context of metrology. For example, the method 600 may further include generating one or more metrology measurements of the sample based on the images at any of the two or more imaging depths. The metrology measurements may include any type of metrology measurements known in the art including, but not limited to, overlay measurements, critical dimension (CD) measurements, film thickness measurements, or film composition measurements. Further, the method may include controlling one or more process tools (e.g., lithography tools, etch tools, additional metrology tools, or the like) based on the metrology measurements using any suitable control technique (e.g., feedback control, feed-forward control, or the like).

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An imaging system comprising:
    an imaging metrology tool, wherein the imaging metrology tool comprises:
        an illumination source;
        one or more illumination optics to direct illumination from the illumination source to a sample;
        a detector;
        one or more collection optics to image the sample onto the detector; and
        one or more aberration-controlling components providing aberration correction for imaging the sample onto the detector according to one or more degrees of freedom, wherein the one or more degrees of freedom include at least a defocus of the imaging system, wherein the one or more aberration-controlling components are integrated with at least one of the one or more illumination optics, the one or more collection optics, or the detector, wherein the one or more aberration-controlling components are adjustable in both position and rotation; and
    a controller including one or more processors configured to execute program instructions causing the one or more processors to:
        determine configurations of the one or more aberration-controlling components associated with the one or more degrees of freedom providing imaging of the sample onto the detector with a quality metric above a selected threshold for a plurality of imaging depths; and
        direct the imaging metrology tool to image at least a portion of the sample at two or more imaging depths in the plurality of imaging depths using the determined configurations of the imaging metrology tool, wherein the imaging metrology tool is configured for sub-surface imaging at a range of sample depths, wherein the one or more aberration-controlling components are configured to maintain imaging quality across all depths within the range of sample depths by adjusting the one or more degrees of freedom for aberration control.

2. The imaging system of claim 1, wherein the defocus of the imaging system compensates for aberrations characterized by a Zernike polynomial Z4.

3. The imaging system of claim 1, wherein the configurations of the one or more aberration-controlling components associated with the one or more degrees of freedom providing imaging of the sample onto the detector with a quality metric above the selected threshold for the plurality of imaging depths further provide constant magnification for the plurality of imaging depths.

4. The imaging system of claim 1, further comprising:
    a translation stage for securing the sample and controlling a sample defocus position relative to the imaging system, wherein the one or more degrees of freedom further include the sample defocus position.

5. The imaging system of claim 4, wherein the sample defocus position compensates for spherical aberrations associated with imaging depths below a surface of the sample.

6. The imaging system of claim 4, wherein the sample defocus position compensates for aberrations characterized by at least one of Zernike polynomials Z9, Z16, or Z25.

7. The imaging system of claim 1, wherein the configurations of the one or more aberration-controlling components associated with the one or more degrees of freedom for aberration control comprises:
a position of at least one of the one or more aberration-controlling components.

8. The imaging system of claim 7, wherein the one or more aberration-controlling components comprise:
two or more lenses.

9. The imaging system of claim 7, wherein at least one of the one or more aberration-controlling components comprises:
at least one translatable mirror.

10. The imaging system of claim 1, wherein the imaging metrology tool includes an inspection tool, wherein the program instructions further cause the one or more processors to:
identify defects on the sample based on the images generated at the two or more imaging depths.

11. The imaging system of claim 1, wherein the program instructions further cause the one or more processors to:
generate one or more metrology measurements of the sample based on the images generated at the two or more imaging depths.

12. The imaging system of claim 11, wherein at least one of the one or more metrology measurements comprises:
at least one of an overlay measurement, a critical dimension measurement, a film thickness measurement, or a film composition measurement.

13. The imaging system of claim 1, wherein the program instructions further cause the one or more processors to:
control one or more process tools based on images generated at the two or more imaging depths.

14. The imaging system of claim 1, wherein the quality metric comprises:
at least one of a Strehl ratio, a full-width of a point spread function, a modulation transfer function, or a depth of focus.

15. The imaging system of claim 1, wherein determine configurations of the one or more aberration-controlling components associated with the one or more degrees of freedom providing imaging of the sample onto the detector with a quality metric above a selected threshold for a plurality of imaging depths comprises:
determine configurations of the one or more aberration-controlling components associated with the one or more degrees of freedom providing imaging of the sample onto the detector with a quality metric above a selected threshold for a plurality of imaging depths through simulations.

16. The imaging system of claim 1, wherein determine configurations of the one or more aberration-controlling components associated with the one or more degrees of freedom providing imaging of the sample onto the detector with a quality metric above a selected threshold for a plurality of imaging depths comprises:
determine configurations of the one or more aberration-controlling components associated with the one or more degrees of freedom providing imaging of the sample onto the detector with a quality metric above a selected threshold for a plurality of imaging depths through aberration measurements of the imaging metrology tool.

17. The imaging system of claim 1, wherein determine configurations of the one or more aberration-controlling components associated with the one or more degrees of freedom providing imaging of the sample onto the detector with a quality metric above a selected threshold for a plurality of imaging depths is performed during runtime.

18. The imaging system of claim 1, wherein determine configurations of the one or more aberration-controlling components associated with the one or more degrees of freedom providing imaging of the sample onto the detector with a quality metric above a selected threshold for a plurality of imaging depths is performed prior to runtime.

19. The imaging system of claim 1, wherein the one or more aberration-controlling components includes a first adjustable lens and a second adjustable lens, with each of the first adjustable lens and the second adjustable lens are adjustable in both position and rotation.

20. An imaging system comprising:
an imaging metrology tool, wherein aberration correction of the imaging metrology tool is adjustable within three or more degrees of freedom, wherein the imaging metrology tool comprises:
a translation stage for securing a sample;
an illumination source;
one or more illumination optics to direct illumination from the illumination source to the sample;
a detector;
one or more collection optics to image the sample onto the detector; and
one or more aberration-controlling components providing aberration correction for imaging the sample onto the detector according to the three or more degrees of freedom, wherein the one or more aberration-controlling components are integrated with at least one of the one or more illumination optics, the one or more collection optics, the detector, or the translation stage, wherein the one or more aberration-controlling components are adjustable in both position and rotation; and
a controller including one or more processors configured to execute program instructions causing the one or more processors to:
determine configurations of the one or more aberration-controlling components associated with the three or more degrees of freedom providing imaging of the sample onto the detector with a quality metric above a selected threshold for a plurality of imaging depths; and
direct the imaging metrology tool to image at least a portion of the sample at two or more imaging depths in the plurality of imaging depths using the determined configurations of the imaging metrology tool, wherein the imaging metrology tool is configured for sub-surface imaging at a range of sample depths, wherein the one or more aberration-controlling components are configured to maintain imaging quality across all depths within the range of sample depths by adjusting at least one of the three or more degrees of freedom for aberration control.

21. The imaging system of claim 20, wherein the configurations of the one or more aberration-controlling components associated with the three or more degrees of freedom providing imaging of the sample onto the detector with a quality metric above the selected threshold for the plurality of imaging depths further provide constant magnification for the plurality of imaging depths.

22. The imaging system of claim 20, wherein the one or more collection optics include one or more adjustable optical elements providing at least two of the three or more degrees of freedom, wherein the three or more degrees of freedom for aberration control include a sample defocus position corresponding to a working distance between the sample and at least one of the one or more collection optics.

23. The imaging system of claim 22, wherein the sample defocus position compensates for spherical aberrations associated with imaging depths below a surface of the sample.

24. The imaging system of claim 22, wherein the sample defocus position compensates for aberrations characterized by at least one of Zernike polynomials Z9, Z16, or Z25.

25. The imaging system of claim 22, further comprising:
   an autofocus system to control the sample defocus position.

26. The imaging system of claim 22, wherein the configurations of the one or more aberration-controlling components associated with the three or more degrees of freedom for aberration control comprises:
   a position of at least one of the one or more adjustable optical elements.

27. The imaging system of claim 26, wherein the one or more aberration-controlling components comprises:
   two or more lenses.

28. The imaging system of claim 26, wherein at least one the two or more adjustable optical elements comprises:
   at least one translatable mirror.

29. The imaging system of claim 26, wherein the position of at least one of the one or more adjustable optical elements provides at least one of a defocus of the imaging system or magnification correction.

30. The imaging system of claim 22, wherein the three or more degrees of freedom include a defocus of the imaging system.

31. The imaging system of claim 30, wherein the defocus of the imaging system compensates for aberrations characterized by a Zernike polynomial Z4.

32. The imaging system of claim 30, wherein at least one of the one or more adjustable optical elements comprises:
   a phase plate at a pupil plane.

33. The imaging system of claim 32, wherein the configurations of the one or more adjustable optical elements associated with the three or more degrees of freedom comprises:
   a thickness of the phase plate.

34. The imaging system of claim 32, further comprising:
   an optical element selector including two or more phase plates with different thicknesses, wherein the optical element selector selectively places one of the two or more phase plates at the pupil plane.

35. The imaging system of claim 20, wherein the imaging metrology tool includes an inspection tool, wherein the program instructions further cause the one or more processors to:
   identify defects on the sample based on the images generated at the two or more imaging depths.

36. The imaging system of claim 20, wherein the program instructions further cause the one or more processors to:
   generate one or more metrology measurements of the sample based on the images generated at the two or more imaging depths.

37. The imaging system of claim 36, wherein at least one of the one or more metrology measurements comprises:
   at least one of an overlay measurement, a critical dimension measurement, a film thickness measurement, or a film composition measurement.

38. The imaging system of claim 20, wherein the program instructions further cause the one or more processors to:
   control one or more process tools based on images generated at the two or more imaging depths.

39. The imaging system of claim 20, wherein the quality metric comprises:
   at least one of a Strehl ratio, a full-width of a point spread function, a modulation transfer function, or a depth of focus.

40. The imaging system of claim 20, wherein determine configurations of the one or more aberration-controlling components associated with the three or more degrees of freedom providing imaging of the sample onto the detector with a quality metric above a selected threshold for a plurality of imaging depths comprises:
   determine configurations of the one or more aberration-controlling components associated with the three or more degrees of freedom providing imaging of the sample onto the detector with a quality metric above a selected threshold for a plurality of imaging depths through simulations.

41. The imaging system of claim 20, wherein determine configurations of the one or more aberration-controlling components associated with the three or more degrees of freedom providing imaging of the sample onto the detector with a quality metric above a selected threshold for a plurality of imaging depths comprises:
   determine configurations of the one or more aberration-controlling components associated with the three or more degrees of freedom providing imaging of the sample onto the detector with a quality metric above a selected threshold for a plurality of imaging depths through aberration measurements of the imaging metrology tool.

42. The imaging system of claim 20, wherein determine configurations of the one or more aberration-controlling components associated with the three or more degrees of freedom providing imaging of the sample onto the detector with a quality metric above a selected threshold for a plurality of imaging depths is performed during runtime.

43. The imaging system of claim 20, wherein determine configurations of the one or more aberration-controlling components associated with the three or more degrees of freedom providing imaging of the sample onto the detector with a quality metric above a selected threshold for a plurality of imaging depths is performed prior to runtime.

44. The imaging system of claim 20, wherein the one or more aberration-controlling components includes a first adjustable lens and a second adjustable lens, with each of the first adjustable lens and the second adjustable lens are adjustable in both position and rotation.

45. An imaging method comprising:
   determining configurations of one or more aberration-controlling components associated with three or more degrees of freedom providing imaging of a sample with a quality metric above a selected threshold for a plurality of imaging depths with an imaging metrology tool, wherein the imaging metrology tool comprises:
      an illumination source to generate an illumination beam;
      one or more illumination optics to direct the illumination beam to the sample;
      a translation stage, wherein the three or more degrees of freedom include a sample defocus position corresponding to a position of the translation stage along an optical axis of the one or more illumination optics;
      an imaging detector; and
      one or more collection optics to collect light from the sample as collected light and direct at least a portion of the collected light to the imaging detector, wherein the collection optics include one or more adjustable optical elements, wherein the three or more degrees of freedom include configurations of the one or more adjustable optical elements, wherein the one or more aberration-controlling components are adjustable in both position and rotation; and imaging at least a portion of the sample at two or more imaging depths using the determined configurations of the imaging metrology tool, wherein the imaging comprises sub-surface imaging at a range of sample depths, wherein the one or more aberration-controlling components are configured to maintain imaging quality across all depths within the range of sample depths by adjusting at least one of the three or more degrees of freedom for aberration control.

46. The imaging method of claim 45, wherein the configurations of the one or more aberration-controlling components associated with the three or more degrees of freedom providing imaging of the sample onto the detector with a quality metric above the selected threshold for the plurality of imaging depths further provide constant magnification for the plurality of imaging depths.

47. The imaging method of claim 45, wherein the three or more degrees of freedom for aberration control include the sample defocus position corresponding to a working distance between the sample and at least one of the one or more collection optics.

48. The imaging method of claim 47, wherein the configurations of the one or more adjustable optical elements associated with the three or more degrees of freedom for aberration control comprises:
a position of at least one of the one or more adjustable optical elements.

49. The imaging method of claim 47, wherein the one or more adjustable optical elements include at least one of one or more lenses, one or more translatable mirrors, or a phase plate.

50. The imaging method of claim 45, wherein the one or more aberration-controlling components includes a first adjustable lens and a second adjustable lens, with each of the first adjustable lens and the second adjustable lens are adjustable in both position and rotation.

* * * * *